United States Patent [19]
Clark

[11] 3,914,164
[45] Oct. 21, 1975

[54] SYSTEM AND PROCESS FOR BACTERIAL REDUCTION OF WASTES

[76] Inventor: John W. Clark, 205 Hoagland, Las Cruces, N. Mex. 88001

[22] Filed: May 31, 1974

[21] Appl. No.: 475,254

Related U.S. Application Data

[63] Continuation-in-part of Ser. No. 282,929, Aug. 23, 1972, abandoned.

[52] U.S. Cl. ..................... 204/149; 210/13; 210/14
[51] Int. Cl.² ....................... B03D 1/00; C02C 5/12
[58] Field of Search ........... 204/149; 210/13, 14, 44

[56] References Cited
UNITED STATES PATENTS

| | | | |
|---|---|---|---|
| 3,505,188 | 4/1970 | Pan | 204/149 |
| 3,523,891 | 8/1970 | Mehl | 210/14 |
| 3,684,703 | 8/1972 | Marmo | 210/13 |

*Primary Examiner*—John H. Mack
*Assistant Examiner*—A. C. Prescott
*Attorney, Agent, or Firm*—Samuel Meerkreebs

[57] ABSTRACT

A system and process to optimize the environment for protozoa and higher life forms as opposed to conventional systems or processes designed for only bacterial reduction of wastes. The system includes a biological extender where the biological effluent from a settling tank, or the like, includes significant numbers of protozoa and other higher life forms and are mixed very, very gently by electrolytically generated bubbles ranging from 100 to 800 microns (which size range affords the very gentle mixing function) so that the protozoa and other higher life forms can exist and function in an optimum environment where they graze upon enteric bacteria, controlling their numbers while encouraging rapid synthesis of aerobic bacteria by increasing the food available to these desirable bacteria. As a result, biological decomposable materials are reduced at a rapid rate, and enteric bacteria that do not reproduce in the environment being maintained are devoured by the protozoa and higher life forms encouraged and promoted by the desirable environment being maintained.

6 Claims, 8 Drawing Figures

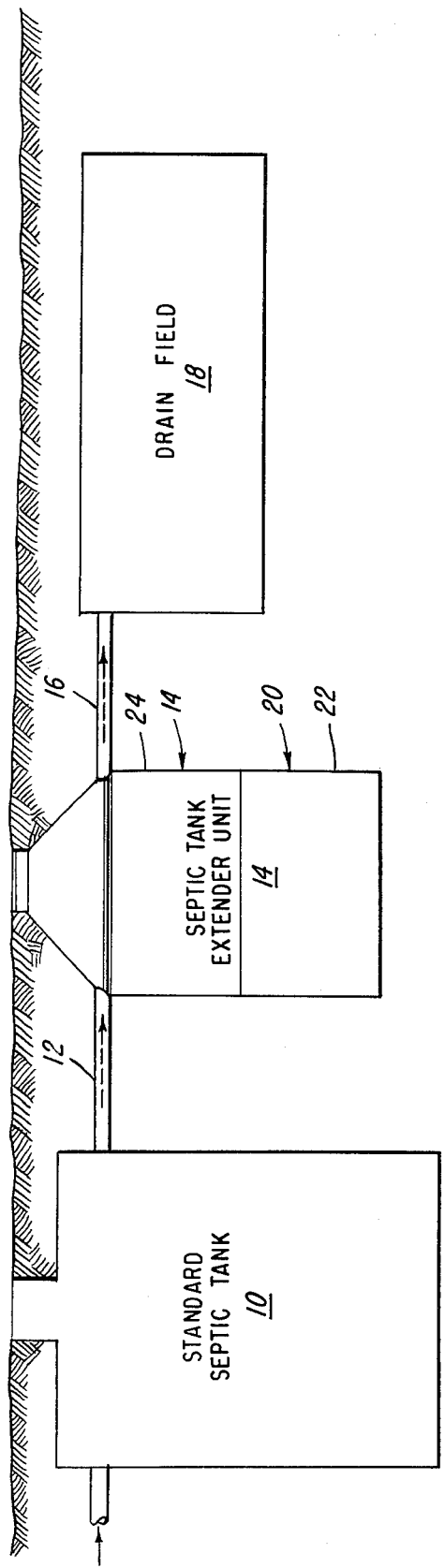

SYSTEM AND PROCESS FOR BACTERIAL REDUCTION OF WASTES

This application is a continuation-in-part of my copending application Ser. No. 282,929 filed Aug. 23, 1972 titled SEPTIC TANK EXTENDER AND METHOD OF TREATING SEPTIC TANK EFFLUENT now abandoned.

BACKGROUND OF THE INVENTION

1. Field of the Invention

This invention relates generally to a system and process of improving the water quality of biological effluent in waste water treatment systems.

2. Description of the Prior Art and Nature of Problems in the Art

Septic tanks were used as early as 1884 in the United States. The past and subsequent widespread use of septic tanks provided both the convenience and safety of interior plumbing away from central collection systems but were accompanied by increasing problems developing and continuing to exist in more densely populated areas. The use of septic tanks in developing areas avoided the complex sewer installations and complex sewage treatment plants with the corresponding costs, bond issues, etc. There continues to be a considerable demand for septic tank type sewage systems around recreational areas, around the periphery of urban areas, in isolated locations, and in early stages of land development.

Septic tank systems have changed very little over the years. In essence, the septic tank systems provide for the collection of water-borne wastes directed to a buried vault where scum, grease and settable solids are removed from the liquid by gravity separation. The retained minerals in the vault are attacked by anaerobic bacterial action and the partially liquified effluent is passed into a sub-surface drain field system where it percolates into the soil which generally comprises final stage treatment of the discharged effluent.

Drain fields used in the final stage treatment, in a sense, must be "open" in the same manner as a sand bed used in conventional water treatment plants. There are many factors contributing to soil clogging in drain fields and these may be classified as physical, chemical and microbiological. Strictly speaking, clogging is a physical phenomenon resulting from the interaction of the integral of all three factors. The concern of the clogging of percolation of drain field beds is quite important in a septic tank system since once the field fails to perform its treatment function on the effluent discharged from the septic tank, the field must be relocated and in the same areas, rocky, for example, this is especially difficult.

Physical alteration or impaction of the porous medium of a drainage field increases the resistance to flow by the reduction of pore size. Physical clogging is apparently operative to some extent in all percolation systems, probably brought about by migration of fine particles through the soil, forming a relatively tight layer under the soil surface.

Chemical clogging is primarily a result of an ion-exchange phenomenon, particularly the exchange of sodium ions for calcium ions and a resultant deflocculation of soil aggregates. This factor is particularly important where chemical water softeners are used or where the natural water has a high sodium ratio.

By far, the largest contributing factor to perculation system failure is microbiological activity which increases when suspended and dissolved organic materials are present in the effluent water. This organic material furnishes food for the microorganisms in the soil and large population build-up which depletes the available oxygen supply. Under prolonged conditions, anaerobic microbiological populations build up with accompanying chemical reactions in the soil where their end products clog the pores of the soil. If the soil is sufficiently aerated, or the water has sufficient oxygen for the bacteria, aerobic bacteria populations are predominant, and their end products contribute to the soil structure and percolation rates are maintained in the drain field.

Ferrous sulfide is the product of an anaerobic environment in which there is considerable need for elements or compounds of accepting electrions. Microorganisms use iron and sulfur in the absence of oxygen as electron acceptors and the waste ferrous iron and sulfide sulfur react to form ferrous sulfide. Ferrous sulfide is a black compound with a hexagonal crystaline structure, molecular weight of 87.92 and specific gravity of 4.84; of particular importance to percolation field problems, it is relatively insoluble in water, only 0.0006 grams being dissolved in 100 ml. of water at 18°C. The formation of ferrous sulfide, being relatively insoluble, contributes to soil clogging by the introduction of fine particulate matter in the soil pores.

Fortunately, ferrous sulfide readily oxidizes to the soluble sulfate form when aerobic conditions, i.e., molecular oxygen is available, are present or restored. The most important factor in minimizing biological clogging of a soil is the maintenance of aerobic conditions in the soil.

Aerobic treatment has been utilized in the reduction of sewage and other wastes for many years. It is focused on several fundamental methods of combining the waste (food) with aerobic bacteria in the presence of oxygen.

Initially, sewage was sprayed into rocks or other solid media. This media physically supported bacteria and the affect of the spray was to bring the waste and oxygen from the atmosphere into contact with the bacteria. The shortcomings were primarily a result of physical limitations to achieving sufficient contact time between the various components of the system.

An alternative was the combination of food, oxygen, and bacteria in an aqueous solution. Oxygen was supplied from the atmosphere by pumping air through diffusers or like systems be direct contact between the surface of the aqueous solution and the atmosphere. This required very extensive surface areas such as lagoons, mechanical agitation of the surface, etc.

The limitations of aerators are many, but the primary ones relative to this disclosure are:

1. Diffusers for introducing compressed air cannot produce minute bubbles and therefore maximum water/air interface is not possible without prohibitive energy losses and costs.
2. Diffusers in the small opening range are more prone to clogging from impurities in the air and from the waste.
3. Diffusers result in violent agitation primarily because of a rapid movement of the relatively large bubbles.

4. The mechanical aerators must deliver large amounts of energy at concentrated points and this creates excessive turbulence.

The prior art systems produced by large bubbles and the attendant violent mixing caused the dispersion of the biological floc, i.e., the agglomeration of bacteria and food in large 100–200 micron particle sizes, that provide a suitable sustaining base for protozoa and other higher life forms to live, graze and multiply. As a result, the growth of bacteria where violent bubble action is present or where excessively minute bubble action is present, reduces the food-to-organism ratio.

The following factors should be considered:
1. If there is a great deal of food (waste), the bacteria in the population will expand, exponentially, and actually inhibit the treatment process unless the sludge containing the excessive organisms is withdrawn and treated separately.
2. The alternative is to maintain a large number of bacteria in relationship to available food supply. The paucity of food (waste) inhibits the growth of new bacteria by providing just enough food to maintain a constant number of bacteria. The rate of waste utilized is slowed and the process becomes less efficient.

At present advise, there are no systems that can maintain treatment in the more rapid phase of bacteria growth (1), rather than the endogeneous respiration phase, (2), without sludge withdrawal and separate sludge stream treatment.

And neither system is able to maintain significant numbers of grazing protozoa and other higher life forms because of the limitation of the aeration device, i.e., turbulence that causes the break-up of biological floc.

SUMMARY OF THE INVENTION

The primary objects of the invention are:
1. To provide an optimum environment for the rapid and complete treatment of organically decomposable matter wherein substantially precisely size-controlled bubbles of oxygen and other gases gently mix a solution of waste with bacteria and oxygen in such a fashion that large numbers of protozoa and other higher life forms are available to graze upon aerobic microorganisms and enteric bacteria. Subsequent to this treatment, the treated effluent is subject to quiescence and clarification. The effluent is then low in biochemical oxygen demand and almost totally free of suspended and settleable solids, and enteric bacteria, and is suitable for discharge in receiving streams, ground, water, or upon the land.

A more particular object of the invention in context with that set forth above, is to reduce and/or eliminate the problems inherent with conventional septic tank systems and the like, including the improvement of bacterial conditions prevailing in the effluent discharged, and to promote aerobic conditions in both a septic tank extender unit or the like as well as in the drain field in which enteric organisms are substantially or completely eliminated; and more particularly, to use electrolysis at a sufficiently reduced voltage so that bubble sizes of a range from 100 to 800 microns (which range of sizes affords a gentle mixing function) and also produces pure oxygen and hydrogen, providing hydrogen acceptors for aerobic microorganisms, with the resultant improved quality of the effluent.

BRIEF DESCRIPTION OF THE DRAWINGS

FIG. 5 is a schematic diagram illustrating how the septic tank extender is incorporated in septic tank type sewage treatment system;

DESCRIPTION OF THE BACKGROUND AND A PREFERRED EMBODIMENT

Figure 1:
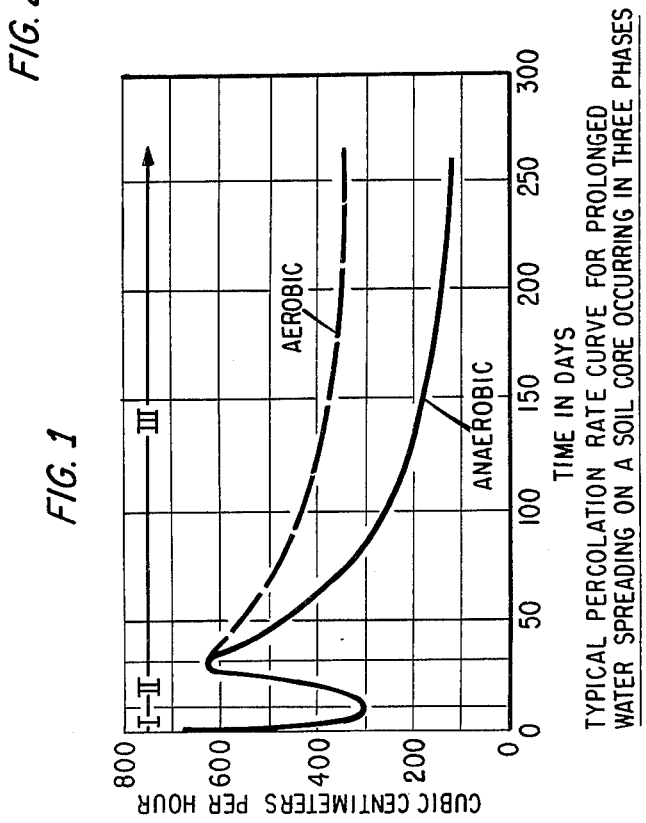
FIG. 1 is a typical percolation rate curve for the infiltration of septic tank effluent into the soil.

Referring to FIG. 1, a typical percolation rate curve for infiltration of septic tank effluent into the soil reveals three substantially distinct phases - I, II, and III. Phase I normally results from slaking of the soil and entrapping of air; Phase II results from removal of entrapped air by solution in the percolating water; and Phase III shows the long-term decrease in permeability primarily due to microbial activity and how it can be reduced or eliminated by an aerobic soil environment.

Figure 2:
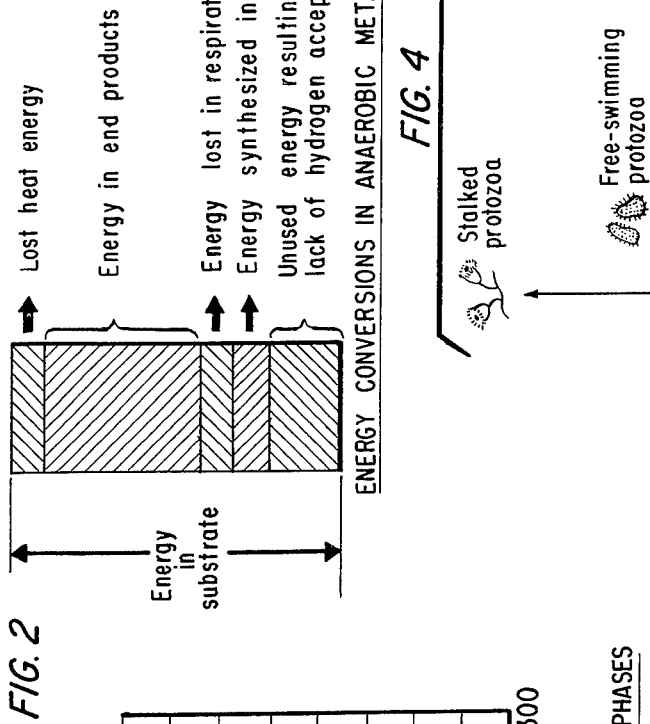
FIG. 2 is a typical energy conversion diagram for anaerobic bacteria in the substrate.
Figure 3:
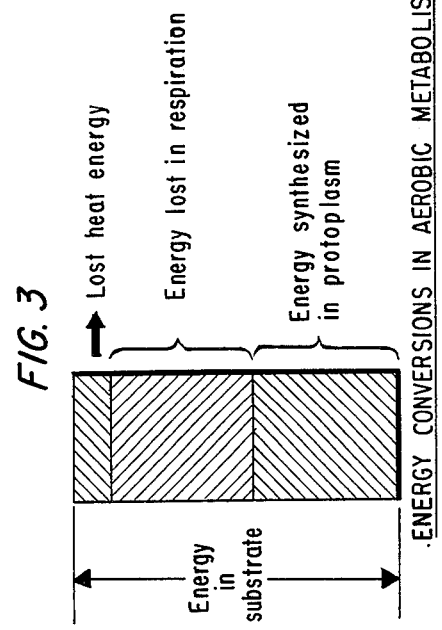
FIG. 3 is a typical energy conversion diagram for aerobic bacteria in the substrate.
Figure 8:
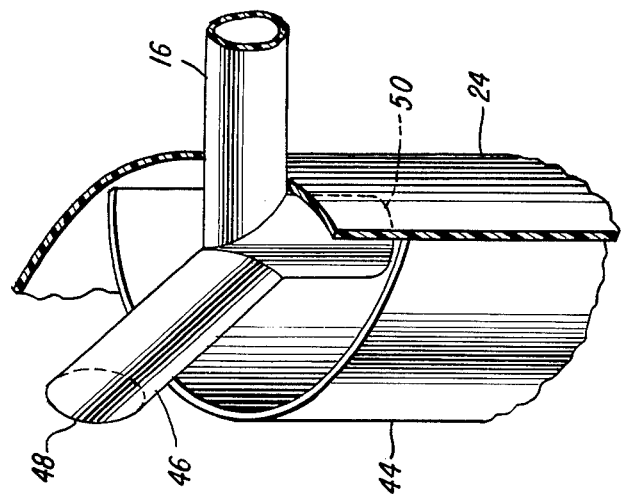
FIG. 8 is a fragmentary, enlarged perspective view showing the effluent-outlet of the extender.
Figure 7:
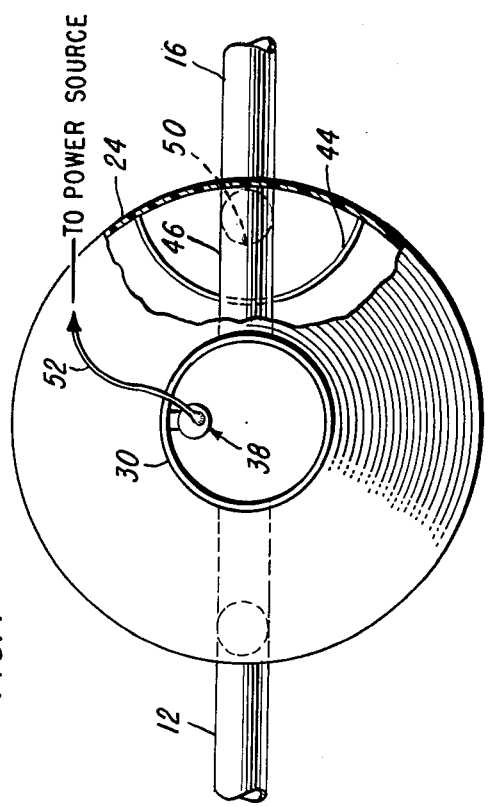
FIG. 7 is a top plan view of FIG. 6.

In FIGS. 2 and 3 there is shown the typical energy conversion for anaerobic and aerobic bacteria, respectively. In a septic tank, organic matter is the substrate (food) used as an energy source by microorganisms. The majority of organic matter in domestic sewage is in the form of large molecules which cannot penetrate the bacterial cell membrane. The bacteria, in order to metabolize high molecular weight substances, must be capable of hydrolyzing the large molecules into diffusible fractions for assimilation into their cells. Therefore, the first biochemical reactions are hydrolysis of complex carbohydrates into soluble sugar units, protein into amino acids, and insoluble fats into fatty acids. Under anaerobic conditions (septic tank conditions), soluble organics are decomposed to intermediate end products such as organic acids and alcohols, along with the production of carbon dioxide and water.

Energy stored in organic matter (sewage) is released in the process of biological oxidation by dehydrogenation of substrate, followed by transfer of hydrogen, or electrons, to an ultimate acceptor. The higher the ultimate hydrogen acceptor is on the energy (electromotive) scale, the greater will be the energy yield from oxidation of 1 mole of a given substrate (food). Aerobic metabolism using oxygen as the ultimate hydrogen acceptor yields the greater amount of energy. The least energy yield results from anaerobic (septic) respiration, where a portion of the yield is a reduced organic compound.

Biochemical reactions are performed by oxidation-reduction enzymes. Enzymes are organic catalysts which perform biochemical reactions at temperatures and chemical conditions compatible with biological life. The make-up of these enzymes determines what chemical reaction will occur.

Synthesis is the biochemical process of substrate utilization to form new protoplasm for growth and reproduction. Microorganisms process sewage to create new cells.

The relationships between metabolism, energy, and synthesis are important in understanding biological treatment systems. The primary product of metabolism is energy, and the chief use of this energy is for synthesis.

The major limitation of anaerobic (septic) growth is energy, due to the fact that, in anaerobic decomposition, a low energy yield per unit of substrate results from incomplete breakdown. In other words, the limiting factor in anaerobic metabolism in a lack of hydrogen acceptors. When the supply of biologically available energy is exhausted, the process of metabolism and synthesis cease. Therefore, the effluent from a typical septic tank has a supply of food (substrate carbon) in the form of energy in the end products and unused energy resulting from a lack of hydrogen acceptors. In an aerobic process, the abundance of oxygen creates no shortage of hydrogen acceptors and the substrate carbon is rapidly exhausted through respiration of carbon dioxide and synthesis into new cells.

AEROBIC DIGESTION

Figure 4:
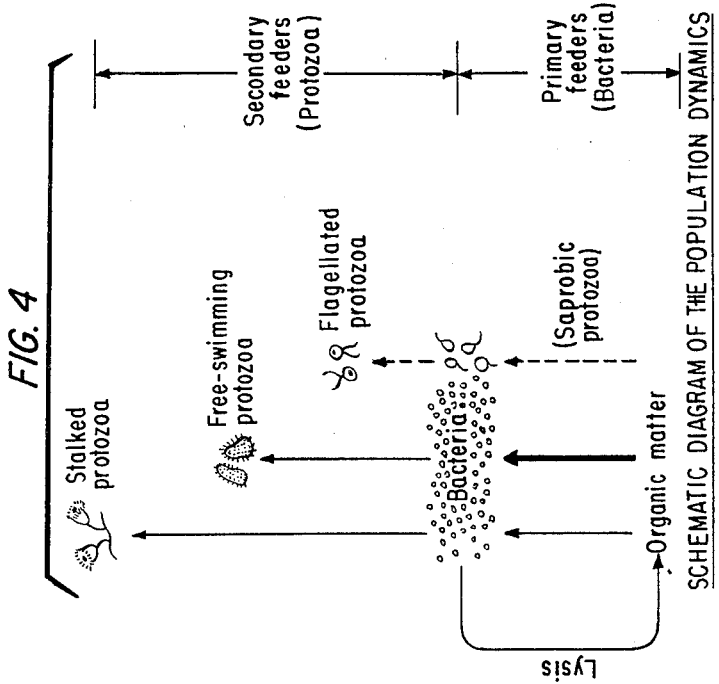
FIG. 4 is a schematic diagram of population dynamics found in septic tank effluents being treated by electrolysis.

The process of anaerobic digestion (septic tanks) is carried out by a wide variety of bacteria. The process of aerobic digestion is carried out by mixtures of bacteria growing in mutual association with other microscopic plants and animals. FIG. 4 illustrates the population dynamics in an aerobic system. Protozo, not active in a septic tank, feed on living organic matter (bacteria) in aerobic systems. They grow in association with the bacteria in a prey-predator relationship, i.e., the bacteria (plants) synthesize the organic matter (sewage) and the protozoa (animals) consume the bacteria. One protozoan consumems thousands of bacteria with two major benefits: (1) removal of the bacteria kills off the bacterial forms that do not produce in the aerobic environment (enteric bacteria) and (2) also stimulates further bacterial growth by those bacteria involved in extraction of organic matter from solution; further, the liquid is clarified and a considerable amount of energy is utilized in going from one tropic level to another (plant to animal).

Referring to FIG. 5, suitably installed beneath the ground level in a septic tank sewage treatment system is a standard septic tank 10 having an effluent outlet 12 connected to the inlet of a septic tank extender 14 which in turn has an outlet 16 for directing the effluent to a drain field 18.

Figure 6:
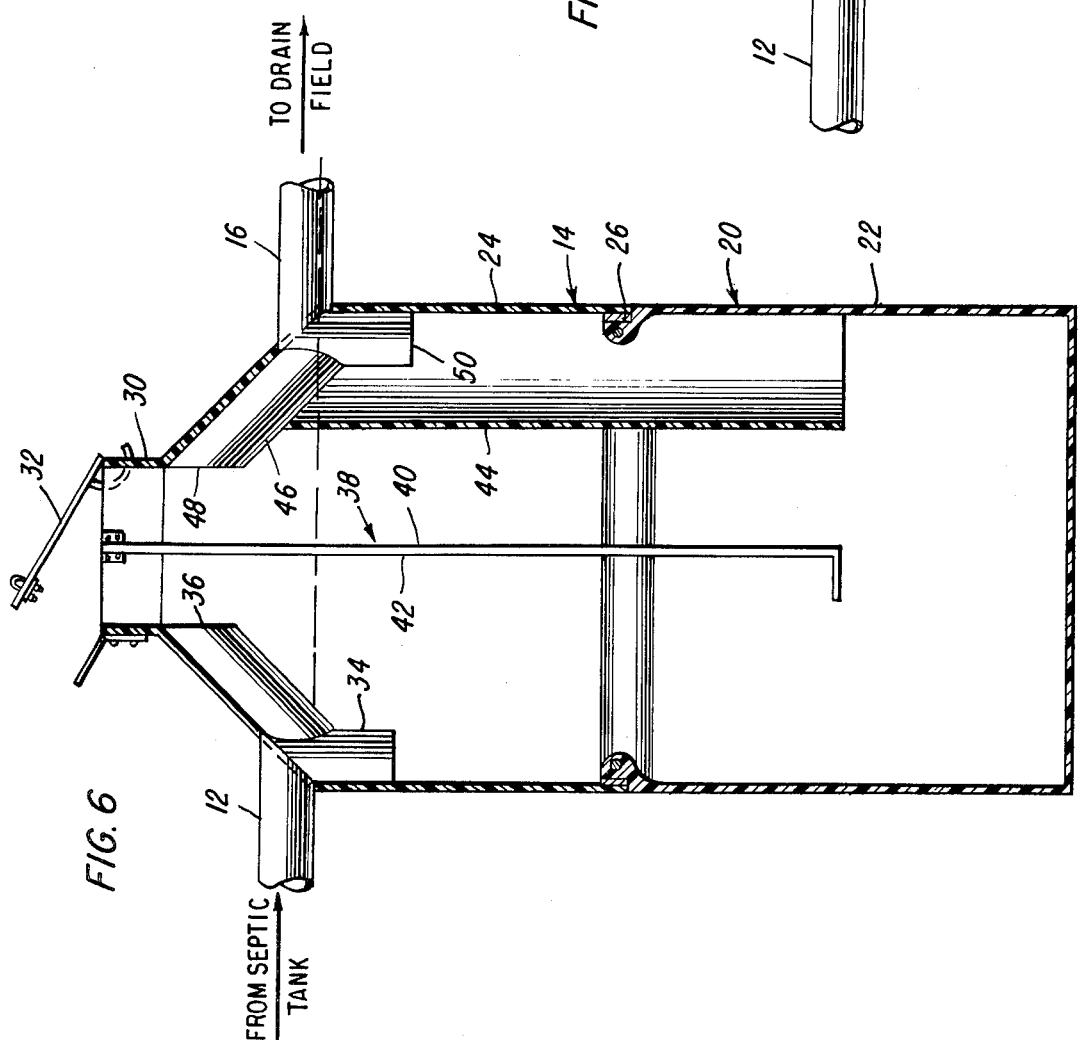
FIG. 6 is an enlarged vertical section through the septic tank extender.

The tank extender 14 (see FIG. 6) comprises a shell 20 preferably comprising a lower section 22 and upper mating section 24 suitably joined at a medial portion 26. The upper section 24 incorporates an access tunnel 30 closed by a lid 32 incorporating a lock-and-hasp assembly. The tank or shell is preferably produced from fiberglass or the like to afford long-life with minimum deterioration when subject to exposure to the raw sewage, sewage byproducts, etc., as well as bacterial action when beneath the ground. The inlet pipe 12 discharges the septic tank effluent through a depending pipe 34 which has an upper opening communicating with the tunnel 30 at 36, for example, to accommodate discharge from the septic tank. Depending within the extender tank is an electrolytic cell 38 comprising spaced electrodes 40 and 42, spaced so that minimum current will be required to attain maximum gas generation. An arcuate baffle plate 44 depends into the tank and opens to the interior of the extender tank communicating with a substantially Y-connection 46 having an upper opening 48 to accommodate for overflow, and a lower opening 50 communicating with the outlet pipe 16 connected to the drain field.

The septic tank is of the standard variety, can comprise one such as that disclosed in the U.S. Pat. Nos. to Monson, 2,796,176 or 3,097,166, for example.

The electrodes 40, 42 are connected to a suitable source of direct current 52 and the electrodes are so spaced from each other as to minimize the voltage drop. Suitable timer-switching means (not shown) are incorporated in the circuit flow (approximately every hour) to maintain the electrodes clean, i.e., by reversing the anode-cathode relationship.

The effluent discharged from the septic tank is of a character to support electrolysis at the relatively low voltage sufficient to produce free molecular oxygen and free molecular hydrogen gas without producing significant amounts of chlorine or other similar type products that interfere with the bacterial activity. The gases generated at this low voltage are of small bubble size and do not disturb the growing aerobic bacterial colonies and the oxygen is immediately dissolved in solution for the microorganisms. Some of the molecular hydrogen is dissolved in solution, but some also rises through the solution to produce a gentle mixing of the liquid. Some hydrogen is utilized by hydrogen-reducing bacteria in the slight froth that will develop on the surface of the effluent; oxygen for these bacteria is provided from the surface air above the liquid through the vent opening.

Oxygen transfer efficiency is normally stated in terms of pounds of oxygen transferred per pound of oxygen supplied; aeration efficiencies with normal atmosphere generally range from 1 to 10%; in the septic tank extender, oxygen transfer efficiency approaches almost 100%. The gas transfer equation across an air-water interface follows a first order relationship:

$$dC/dt = K_L A(C_s - C_a)$$

where $dC/dt$ = mass of gas transferred per unit of time
$K_L$ = gas transfer coefficient
$A$ = gas-liquid interfacial area
$C_s$ = equilibrium gas saturation of liquid
$C_a$ = actual gas concentration of liquid.

The smaller the bubble size, the greater the value of A and more rapid the rate of gas transfer. In the electrolysis system, the bubble size is maintained at a minimum by limiting the current density and by the shape of the electrodes. Very small diameter wire electrodes produce smaller average bubble diameters than do flat plates at the same current density per unit surface area of electrode.

The effluent from the septic tank (entering pipe 12) contains large numbers of the faculative bacteria, especially species of Pseudomonas, Flavobacterium, Alcaligenes, Escherichia, and Aerobactor, that have contributed to acid production in the anaerobic environment. The effluent also contains intermediate and unused energy sources (food) that can be utilized with oxygen as a hydrogen acceptor. There are also present enteric bacteria from the human intestinal tract and some obligate anaerobes, especially the methane bacteria.

The septic tank extender contains, besides the microorganism population being discharged by the septic tank effluent, large numbers of aerobic bacteria which require free dissolved oxygen to live and multiply. The extender also has a population of protozoa and higher animal forms; see FIG. 4. The protozoa are extremely important to the novel system in that they utilize the large bacterial population given off by the septic tank (contained in the effluent discharge) as food. Protozoa that have been isolated from the extender unit include forms of Paramecium, Amoeba, Monas, Bodo, Colpoda, and various stalked types. The strict anaerobes and the enteric bacteria that are not faculative are quickly utilized as food by the protozoa and the numbers of other bacteria are rapidly reduced in numbers. The Most Probable Number (MPN) of the coliform bacteria (faculative) were reduced 95% and the fecal coliform (enteric) were eliminated in an 8 hour detention period when testing a model system fed from a septic tank handling normal domestic sewage over a period of 6 months.

Temperature

The temperature of domestic sewage varies a little with season of the year and geographic location but this is not significant enough to cause many problems. The temperature of the effluent is controlled by the uses placed on the water in the home - flushing toilets, laundry, showers, kitchen use. Regardless of the initial temperature of the effluent water on reaching the septic tank, the water coming out of the septic tank into the extender unit is an average value representative of the ground temperature at the average depth of the unit in the ground. This varies around 72°F with the average temperature going up in summer and down in winter. Chemical and biological processes increase their rates as the temperature increases and decrease their rates as the temperature decreases. The rate of oxygen production by the electrolysis unit is basically constant in this range. Temperature has no significant effect on the process at the range normally expected in temperate climates. There is some heating of the water by the electrolysis unit and this is a function of the soil on insulating conditions around the tank but this is around 2°F increase in average temperature in typical unsaturated soils.

Salt or sodium chloride in the waste water

There is always a sodium chloride increase from that found in the water supply to a house and in the sewage effluent leaving the house. The usual increase in sodium chloride is in the order of 25–30 mg/l for domestic sewage. This comes from the kitchen, from body waste, from water softeners and from a concentrating effect on the salts from using some of the pure water. The normal chloride content of public waters in the U.S. is below 250 mg/l (preferable limit by U.S. Public Health Services standards). Most waters are way below this value. Domestic waste water effluent will always have a chloride content above 25 mg/l. Therefore, the chloride content of domestic sewage is always high enough, along with other salts, to form a satisfactory electrolyte but never reaching a point that harmful amounts of chlorine are produced with the voltage and current density operating range of the unit (6–25 volts and 1 ampere per square centimeter). Also, the conductance contributed by the hydrogen ions is greater than that by other common ions (septic tank effluent normally less than pH 7).

Round wire electrodes apparently function best as they give a uniform small bubble size for a given current density up to about 4.0 amperes per square centimeter of electrode surface. Above this current density, several large bubbles are produced that have erratic vertical paths and interfere with other bubbles. Any electrode shape that deviates from a circle exposes a greater surface area in contact with the liquid. Bubbles that are released from a greater surface area hit other bubbles being formed, dislodging them and increasing the size of the original bubble by absorption of the smaller bubbles. This larger bubble size decreases the efficiency of the oxygen produced as the larger bubbles rise to the surface of the liquid rapidly and some of the oxygen is lost to the atmosphere at the liquid surface.

The closer the electrodes are together, the less voltage is required for the same current density. Practical limitations of possible short circuiting by fine particles of metallic substances held in suspension by the liquid and interference by the bubbles being produced limit the spacing to about 0.1 inches (⅛ inch spacing was used with 26 gauge platinum wire in a pilot model). The resistance was between 12 to 26 ohms in natural domestic septic tank effluents tested. The septic tanks tested represent domestic waters a little higher in total dissolved salts than would be representative of the U.S. because the water source was from wells and contained higher than average dissolved solids.

With respect to the critical distance of the electrodes if too close together they would short out - the distance apart is partly a function of the total dissolved salts, especially sodium chloride, in solution. to satisfy the minimum voltage, it is necessary to have the electrodes as close together as practical (⅛ inch spacing used in experiments). With this spacing, voltage, and current density, the reaction proceeds stoichiometrically to oxygen and hydrogen with a little heat given off and some depositation on the electrodes in certain waters. This small deposition is released when the current is reversed.

In high sulfate waters common to the southwest, a small amount of calcium and magnesium sulfate is deposited. The average electrical efficiency in producing oxygen is 95%. Platinum may be a catalyst in this process as platinum electrodes function the best. Experiments were run using electrodes produced from noble metals and non-precious metals.

In each case, except platinum, the current dropped off rapidly by passivation due to oxide layer formation on the electrode. Metals used were titanium, tantalum, canadium, molybdenum, tungsten, lead and tin. It would appear that it would be logical to place a titanium wire with platinum to reduce electrode costs.

Platinum appears to be the most economic electrode material since only about $6.00 worth was used in each extender unit.

In summary:

The liquid holding time in a conventional septic tank is at least 24 hours. This extender is an additional unit that connects onto a conventional septic tank between the septic tank and the disposal field. The septic tank would remain the same but the disposal field could be reduced by ⅓ to ½ and the field would have a much longer useful life; an infinite life under ideal conditions. The liquid holding time for this extender unit should be 6 to 8 hours. The efficiencies should be about as follows, based on model studies:

| Paratmeter | Raw Sewage | Septic Tank Effluent | Electrolysis in Extender Unit Effluent |
|---|---|---|---|
| BOD, mg/l | 150 | 75 | 25 |
| COD, mg/l | 310 | 160 | 50 |
| Suspended Solids, mg/l | 185 | 50 | 20 |
| Volatile Solids, mg/l | 265 | 160 | 55 |
| Coliform Count per 100 ml | 10,000,000 | 10,000,000 | 1,000 |
| Fecal Foliform Count per 100 ml | 1,000,000 | 800,000 | 0 |

A septic tank needs to be pumped out every four or five years with this new addition. The major cause of failure in a septic tank is the drain field stopping up. This is where the big savings would occur. The life of the disposal field would be considerably extended by a factor of 2 or more. Under favorable conditions the disposal field would last indefinitely. The unit could also be attached to existing septic tanks and thereby improve overloaded drain fields. The major improvement would come from the reduction of the ferrous sulfide in the disposal field soil. This would regain some of the original infiltration capacity and tend to keep the soil open.

RESUME

The relationships between metabolism, energy, and synthesis are important in understanding biological treatment systems. The primary product of metabolism is energy, and the chief use of energy is synthesis, i.e., the biochemical process of substrate utilization to form new protoplasm for growth and reproduction. Microorganisms process sewage to create new cells.

In an aerobic process, the abundance of oxygen and substrate carbon result in the rapid synthesis of new cells. A point is reached at which the demands upon the substrate caused by large numbers of microorganisms results in a declining growth rate as the energy available in the substrate is sufficient only for respiration of the existing life.

FIG. 4 illustrates the population dynamics in an aerobic system. Protozoa, not active in anaerobic systems or as active in turbulently mixed aerobic systems, feed on living organic matter (bacteria) in the waste.

They grow in association with the bacteria in a prey-predator relationship, i.e., the bacteria (plants) synthesize the organic matter (waste) and the protozoa (animals) consume the bacteria. As the protozoa multiply, large quantities of energy (from the waste-bacteria synthesis) are absorbed by the synthesis of celluler material - the protozoa, of a higher tropic level.

In effect, the presence of protozoa and other higher life forms make it possible to store additional energy within the system rather than withdrawing energy in the form of excess bacteria or pemitting the excess bacteria to decrease the rate of synthesis because of the competition for limited food supply.

One protozoa consumes thousands of bacteria, storing in its cells the energy represented by the creation of a living matter of a higher tropic level. The result is that the control of the numbers of bacteria stimulates continued synthesis requiring the rapid utilization of waste material.

A major collateral benefit is that the protozoa and other higher life forms prey on all bacteria in the mixed waste and the bacteria forms that do not reproduce in the environment are rapidly destroyed. As a result, the number of enteric bacteria are drastically reduced in this process where ordinary anaerobic and aerobic systems do not generate sufficient higher life forms to prey on the non-reproducing bacteria.

Referring to FIG. 1, the biological extender comprises a tank in which a bubble producing device such as a grid of electrodes in a cathode-anode relationship electrolytically produces oxygen and hydrogen bubbles of a diameter $dB$ where $100 \geq dB \leq 800$. The oxygen bubbles provide oxygen for bacteria and the hydrogen bubbles gently mix the solution while rising to the surface. The waste is gently mixed without agitating sufficient to disturb the growth of the biological floc necessary to sustain the expansion of the population of protozoa and other higher life forms.

The control of the bubbles produced by electrolytic action is accomplished by selecting the shape and size of material of the electrodes and the current density expressed as amperes per square cm of electrode surface.

The polarity of the electrodes is changed periodically to maintain electrode efficiency.

This novel system is designed to optimize the environment for protozoa and higher aerobic life forms as opposed to conventional systems that are designed for only bacterial reduction of wastes.

For the most part, the microscopic animals (Protozoa and higher animals) are scavengers which clean the excess bacteria and some particulate matter from solution. This action is significant in the exemplary extender in producing clarified effluents low in enteric bacteria and by stimulating maximum bacterial growth. The microscopic plants (bacteria) eat the waste (sewage) and are in turn eaten by the microscopic animals (Protozoa and higher animals). The net result is to produce a clarified effluent low in both organic matter and bacterial populations.

Oxygen must be transferred from a bubble into the liquid and then into the microorganisms. The fact that oxygen is a very insoluble gas is the chief factor against a high transfer rate. The rate of oxygen transfer is a function of the oxygen gradient existing between the gas and the liquid, the surface area of contact between the gas and the liquid, the time of contact, temperature, and other characteristics of the liquid. The maximum rate of oxygen transfer for any given system occurs when the oxygen concentration in the liquid is zero. This gives the maximum driving force from gas to the liquid.

The surface area of contact between the gas and the liquid increases as the bubble size decreases, so that small bubbles transfer more oxygen than larger bubbles. As bubble size decreases, a point is reached where the size of the bubble is so small that the rate of oxygen transfer decreases with further reduction in bubble size (about 90 microns). The decreased oxygen transfer is due to reduced turbulence around the bubble as it moves through the liquid and the resultant failure to remove the saturated layer of oxygenated liquid from around the bubble. This reduced rate-of-rise velocity also cuts down on the mixing currents and allows a high percentage of the liquid in the tank to be unmixed and therefore to contain low or no dissolved oxygen.

As the bubble size is increased, a rapidly rising bubble is produced but it has such a short time period before it breaks the surface of the liquid that the net result is a smaller amount of the oxygen is transferred to the liquid and much of the oxygen introduced leaves the liquid surface and is lost to the process.

Another disbenefit of the large bubble size is that the mixing is so turbulent that floc particles are not able to develop properly. Ideally, the floc particles should be large enough to make an operational base for the stalked ciliated protozoa but small enough so that oxygen will penetrate the floc particles and support complete aerobic activity. Floc particles in the range of 100 to 200 microns appears to be most efficient.

The ideal bubble size is one that allows a sufficient mixing to give enough turbulence around the oxygen bubbles so that high oxygen transfer rates are present and the bubbles are small enough so that few oxygen bubbles leave the liquid surface.

Mixing and oxygenation is most efficient with the combination of hydrogen and oxygen as produced by electrolysis. Hydrogen is only slightly soluble in water and the water has little hydrogen demand as compared with oxygen so that the liquid in the range of detention times of the effluent being treated becomes saturated with hydrogen. Therefore, all of the hydrogen gas volume is available for the production of mixing currents. Most efficient treatment of the effluent is in the range of 100 to 800 microns in oxygen bubble size. This condition can be produced, for example, by using smooth platinum electrodes with a current density between 0.4 and 4 amperes per square centimeter. Although other materials can be used as electrodes, the current densities can vary with the roughness of the electrode surface. The bubbles tend to form on the roughness points and larger bubbles are produced at lower current densities per unit area as compared to a smooth electrode surface like platinum.

When the bubble size is less than 100 microns, little mixing occurs and the liquid becomes super-saturated with oxygen above the electrode and extending up to the liquid surface. Little mixing takes place and a high degree of frothing and foaming occurs on the liquid surface immediately above the electrode. Also, the numerous small bubbles of oxygen and hydrogen entrained in the liquid and the super-saturated condition of the liquid immediately above the electrode produces a flotation effect on all particulate material in the liquid. These small bubbles form on the surface of the particles entrained in the liquid and cause the particles to be raised to the surface of the liquid and they become tied up in the foam formed at the surface. (Mormo Patent) This froth or foam holds the particulate material and other floc particles suspended in the dense mostly hydrogen foam and the biological processes in the foam go septic with the resultant odors and much slower reduction rate for the organic material.

Accordingly, as substantiated by the experiments set forth below, it has been found that in the range of bubble sizes from about 100 to 800 microns, the maximum numbers of protozoa and other higher life forms are maintained and the products of new bacterial cells is at a maximum. When the production of the new bacteria cells is at a maximum, the organic material within the effluent being treated is reduced at a maximum rate. When the protozoa and higher life form populations are at a maximum, the enteric bacteria that reproduce in the aerobic environment, i.e., produced by the 100–800 micron range bubbles, would be consumed by the protozoa and higher life forms as food.

Accordingly, the effluent becomes depleted of the enteric and undesirable bacteria, with a resultant effluent and end-product which better satisfies environmental demands.

In order to evaluate the design and operation, full-size septic tank extenders were used, and the following tests were run:

Three parallel septic tank extender tanks were set up and fed a common septic influent and a 24-hour detention period was used. The tanks were numbered No. 1, No. 2, and No. 3. The tank No. 1 was operated at the lower extreme of bubble size, tank No. 2 was operated in the optimum range of bubble size in accordance with the invention, and tank No. 3 was operated using a large bubble size. The tanks were fed septic effluent from domestic septic tanks. Measurements and observations were made for mixing, dissolved oxygen, protozoa and higher life forms, Coliform, Fecal Coliform, biochemical oxygen demand, settable solids, floc size, bubble size, and amperage.

The results were as follows:

Septic Influent

Common to tanks No. 1, No. 2 and No. 3 -
Dissolved oxygen — 0
Protozoa or higher life forms per drop of liquid — 0
Coliform per 100 ml — $1.7 \times 10^6$
Fecal Coliform per 100 ml. — $1.9 \times 10^5$
Biochemical oxygen demand — 93 mg. per liter
Settable solids — 10.2 ml. per 1-hour Tank No. 1

Amperage — 4.0 amps
Current density on platinum electrode — 0.1 amp/per sq. centimeter
Bubble size — 60 microns
Floc size — 150 to 350 microns Extender Effluent From Tank No. 1

Dissolved Oxygen — 0.2 mg/l
Protozoa or higher life form per drop of liquid — 0.1 average
Coliform per 100 ml. — $8.7 \times 10^5$
Fecal Coliform per 100 ml. — $1.1 \times 10^5$
Biochemical Oxygen demand — 47 mg. per liter
Settable solids — ml. per 1-hour — 2.1

Tank No. 2

Amperage — 4.0 amps

Current density on platinum electrode — 1.1 amps per sq. cm.
Bubble size — 200 microns
Floc size — 100 to 170 microns

Extender Effluent

Dissolved oxygen — 2.3 mg. per liter
Protozoa or higher life forms per drop of liquid — 1.8
Coliform per 100 ml. — $1.2 \times 10^5$
Fecal coliform per 100 ml. — $1.3 \times 10^3$
Biochemical oxygen demand — 26 mg. per liter
Settable solids — ml per 1-hour — <0.1

Tank No. 3

Amperage — 4.0 amps
Current density on Platinum electrodes — 8.7 amps per sq. cm.
Bubble Size — 1000 microns
Floc size — 30 to 50 microns

Extender Effluent

Dissolved oxygen — 0.1 mg per liter
Protozoa or higher life forms per drop of liquid — 0.2
Coliform per 100 ml. — $6.6 \times 10^5$
Fecal Coliform per 100 ml. — $9.1 \times 10^4$
Biochemical oxygen demand — 43 mg. per liter
Settable Solids — ml per 1-hour — 4.1

MIXING

Organic dye was introduced at the liquid surface above the center of the electrode and the time was determined for all the volume of the tank above the level of the electrode to contain the dye by observation.

Tank No. 1 - The dye hardly moved away from the center of the tank and never reached the influent end of the tank before being lost to the system.

Tank No. 2 - The dye completely filled the volume of the tank above the electrode in 6.8 minutes.

Tank No. 3 - The dye completely filled the volume of the tank above the electrode in 4.7 minutes.

The conclusions proved by the experiments and run as set forth above were:

In Tank No. 1:

Because the bubble size was maintained below 100 microns, floc particles developed were too large for the dissolved oxygen in the effluent to diffuse completely through them and therefore the interior portions of the floc particles became septic and the rates of bacterial reduction of the floc particles (waste) was slowed down.

Further, the reduced mixing because of the slow rate of ascent of bubbles of too small a size, the amount or volume of liquid in which oxygen could penetrate (to support protozoa and higher life forms) was reduced.

In Tank No. 3:

Where larger sized bubbles were produced, i.e., about 1000 microns, through increased current density on the electrodes, the following disbenefits were noted:

1. the large bubbles rose so rapidly that they practically broke the surface of the liquid and were lost to the process and therefore the oxygen was not available to support the necessary aerobic life forms;

2. in addition the extreme turbulence created by the rapidly rising larger bubbles actually broke up the floc particles which interfered with the availability of the floc particles for life-support of the desirable protozoa and higher life forms.

In Tank No. 1, due to too small a bubble size, portions of the liquid immediately above the electrodes were super-saturated with dissolved oxygen and other portions remote from the electrodes had an oxygen deficiency. On the other hand, in Tank No. 3 due to a portion of the oxygen produced leaving the liquid's surface, the average dissolved oxygen content of the liquid was deficient, and accordingly the aerobic population was reduced.

However, in Tank No. 2:

By maintaining the bubble size within the 100 to 800 micron range, it was observed that:

substantially all of the oxygen produced was diffused into the liquid and available to the aerobic life forms; and further, the floc particles were formed and maintained so that they could be utilized by all the protozoa and higher life forms as food and a support base for rapidly reproducing bacterial populations.

With aeration and mixing by electrolysis of a biological effluent, the proper control of the current density on a particular electrode material, determines the bubble size produced by electrolysis and is relatively constant and predictable. The size of the bubble is directly related to the rate of oxygen transfer into the liquid, the degree of mixing, the size of floc particles produced, the distribution of dissolved oxygen throughout the liquid, the type and degree of aerobic biologic activity within the liquid, the quality of the settled liquid effluent, the number of protozoa and higher life forms contained within the liquid and to the bacterial population remaining.

What is claimed is:

1. The process of treating waste water effluent containing biological and decomposable organic matter comprising, in combination, the steps of:

a. introducing a waste water effluent into a tank from which it can flow;

b. electrolytically generating gas bubbles of a size ranging from 100 to 800 microns beneath the surface of the effluent in the lower reaches of the tank for reducing detrimental effects of flotation, preventing turbulent mixing caused by rapid vertical rise of bubbles; maximizing the utilization of oxygen for bacteria and other higher life forms and gently mixing the biological waste water;

c. forming a completely mixed environment containing sufficient dissolved oxygen for bacterial action while preventing the dispersion and breaking up of floc particles so that the floc is maintained within the range from 100 to 200 microns and contains bacterial and substrate upon which protozoa and other higher life forms feed, flourish, and multiply; and d. producing a runoff effluent from the tank which is low in BOD, settable solids and Fecal Coliforms.

2. The process as claimed in claim 1 including electrolytically generating bubbles within the 100 to 800 micron range through generally circular cross-sectioned electrodes in a cathode-anode electrical relationship within the liquid and maintaining the electrodes in a generally horizontal attitute so that the bubbles rising do not agglomerate and form excessively large bubbles falling out of the generating range.

3. The process as claimed in claim 2 including spacing the electodes so that a minimum current is necessary to produce the bubbles by electrolysis within the range of 100 to 800 microns, and in which the bubbles comprise oxygen and hydrogen and a maximum oxygen transfer is obtained in terms of pounds of oxygen transferred per pound of oxygen supplied to the liquid.

4. The process as claimed in claim 3 including spacing the electrode pair a minimum distance without shorting-out a circuit as a function of the total dissolved salts in the effluent and providing a stoichiometric reaction producing the oxygen and hydrogen bubbles within the 100 to 800 micron range.

5. The process as set forth in claim 1 including the step of holding the effluent in the tank and then discharging the effluent from the tank in a condition in which it includes a BOD of 25 mg/l or less, COD of 50 mg/l or less, has suspended solids of 20 mg/l or less, volatile solids of 55 mg/l or less, Coliform count of 1,000 per 100 ml or less and a Fecal Coliform count approaching 0.

6. The process of treating biologic effluent of a waste water system to optimize the environment for Protozoa and higher life forms for producing clarified effluents low in enteric bacteria and by stimulating maximum bacterial growth, comprising the steps of:
   a. introducing an effluent into a tank and holding it there for treatment and subsequent runoff;
   b. electrolytically generating nacent oxygen and hydrogen bubbles from a stoichimetric reaction in the lower reaches of the tank;
   c. controlling the bubble size in a range of from 100 to 800 microns through current density control so that normally insoluble oxygen transfers into the liquid as a function of the oxygen gradient between the gas and liquid, the period of contact, temperature and characteristics of the liquid and a high rate of oxygen transfer is maintained by controlling bubble size and the liquid is gently mixed with substantially no oxygen leaving the surface of the liquid and floc particles are maintained in a range of from 100 to 200 microns without dispersion or breaking of floc particles so that the floc contains bacteria and substrate providing an optimum environment for Protozoa and higher life forms feeding, flourishing and multiplying in the effluent being treated.

* * * * *